Nov. 29, 1960   J. F. MURRAY ET AL   2,961,970
HOLLOW PUMP GEAR FOR AIRCRAFT FUEL PUMPS
Filed Oct. 4, 1955   2 Sheets-Sheet 1

INVENTORS
JOHN F. MURRAY
JOHN A. WOTRING
BY
ATTORNEYS

United States Patent Office 2,961,970
Patented Nov. 29, 1960

2,961,970
HOLLOW PUMP GEAR FOR AIRCRAFT FUEL PUMPS

John F. Murray, Northfield, and John A. Wotring, Painesville, Ohio, assignors to Thompson Ramo Wooldridge Inc., a corporation of Ohio Filed Oct. 4, 1955, Ser. No. 538,451

2 Claims. (Cl. 103—126)

This invention relates generally to a pump construction and a method of making pump components and more particularly relates to a gear consisting of a unitary article having inner and outer wall surfaces formed by walls with substantially uniform thickness formed to provide a hollow gear hub having a plurality of circumferentially spaced hollow gear teeth.

Although gear pumps have many important applications in different fields of use, significant utilization of gear pumps is made in the fuel systems of aircraft and particularly such aircraft as are powered by jet engines and similar main propulsion plants.

As the power capacity output of such propulsion plant increases, the gear pumps utilized in the fuel systems of such engines have become larger and larger. One of the more important problems involved in the provision of a satisfactory high capacity high pressure gear pump is the reduction of overall weight. Another problem is the adequate dissipation of thermal energy generated upon operation of the pump.

According to the principles of the present invention, a substantial weight savings is provided in the gear impellers per se. In attaining this end, a gear is provided constituting a unitary article formed in accordance with a novel process, which also constitutes a part of the present invention.

A gear is produced in accordance with a method including the steps of providing a toothed gear hub by a casting metallurgical process as a unitary article having a plurality of circumferentially spaced hollow teeth on the outer surface thereof. More particularly, the gear article is characterized by the provision of inner and outer wall surfaces formed by walls with substantially uniform thickness. Thus, there is provided a large central cavity bounded by a plurality of circumferentially spaced pockets corresponding in number and location to the plurality of circumferentially spaced gear teeth on the outside surface of the gear. In other words, on the inside of the gear, even the teeth, per se, are cored out.

Not only are there substantial weight savings effected in accordance with the principles of the present invention, but it will be appreciated that the thin walled gear thus provided facilitates the transfer of thermal energy from the outside surface of the gear at the area of mesh of the gear teeth to fluid pumping medium circulated throughout the pump and specifically in the hollow cavities of the gear hub and the gear teeth. By insuring the improved dissipation of thermal energy, more favorable operating conditions can be established for the efficient high speed operation of the pump and the consequent increases in capacity which result therefrom.

It is an object of the present invention, therefore, to provide a gear pump in which the overall weight is substantially reduced.

Another object of the present invention is to provide a gear pump wherein the dissipation of thermal energy is considerably improved.

Another object of the present invention is to provide a novel method of making gears for a gear pump.

Yet another object of the present invention is to provide a hollow gear hub having a plurality of circumferentially spaced hollow gear teeth.

Many other features, advantages and additional objects of the present invention will become manifest to those versed in the art upon making reference to the detailed description which follows and the accompanying sheets of drawings in which a preferred structural embodiment of a pump incorporating the hollow gears provided in accordance with the principles of the present invention and constructed in accordance with the novel methods herein disclosed is shown by way of illustrative example.

Figure 1:
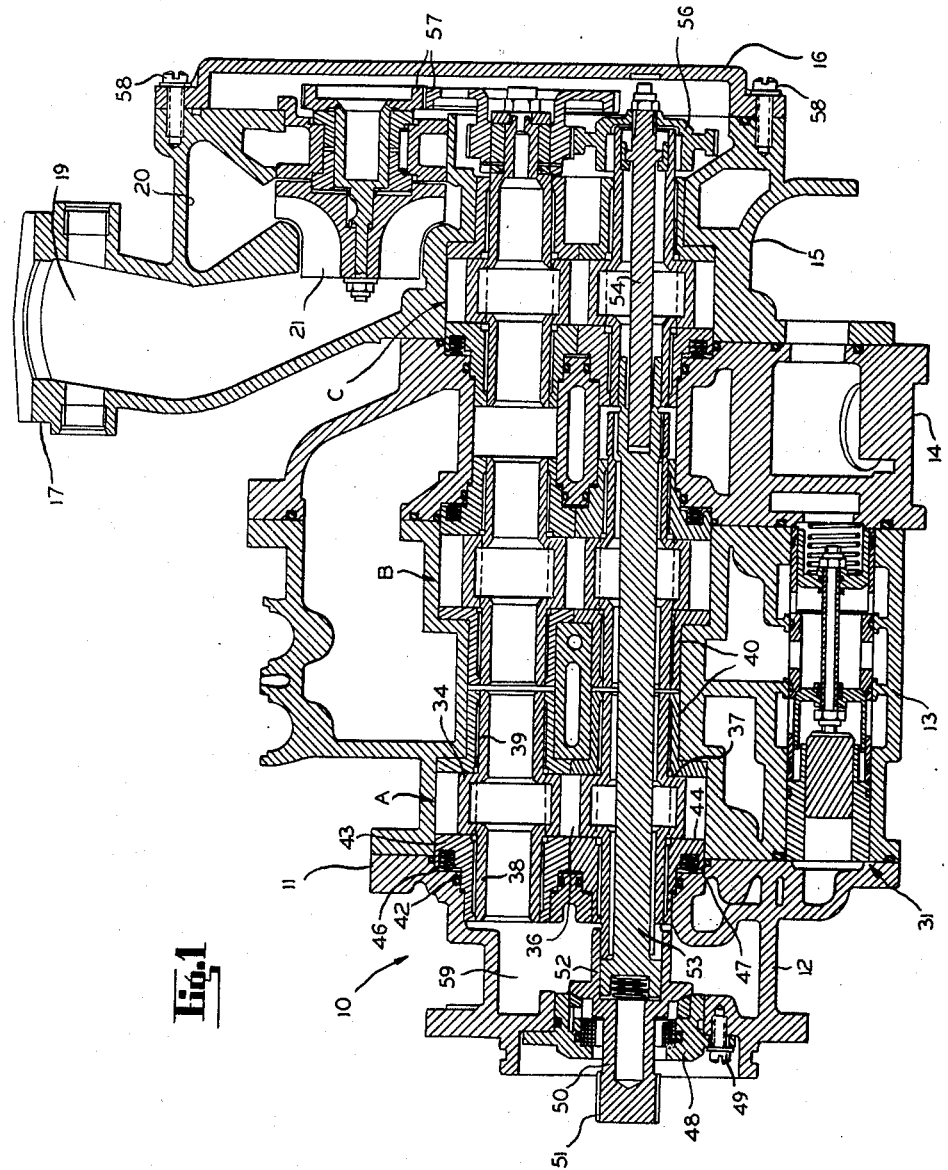
Figure 1 is a cross sectional view of a combination main burner and after burner fuel pump as utilized in the fuel system of a jet powered aircraft.

The pump of the present invention is indicated generally by reference numeral 10 and comprises a casing or housing 11 which constitutes a plurality of connected housing parts identified from left to right in Fig. 1 by the reference numerals 12, 13, 14, 15 and 16.

The housing part 15 has a mounting pad by means of which the pump may be connected to a conduit for supplying fluid to the pump inlet formed in the housing part 15 and indicated by the reference numeral 19. The mounting pad is identified at 17. There is further provided in the housing part 15 a volute pumping chamber 20 in which is rotated a centrifugal impeller 21.

The housing parts 12, 13, 14 and 15 together form three longitudinally spaced pumping cavities for three separate gear pumping units indicated generally by the reference characters A, B and C respectively.

Although not necessary to a proper understanding of the principles of the present invention, it may be noted that the pump 10 in a typical installation is associated with a fuel cell from which fluid is supplied to the inlet 19, initial pressurization of the fluid being effected by the centrifugal impeller 21 in the volute pumping chamber 20. The centrifugal pumping unit discharges through a straining means to a common inlet supplying each of the gear pumping units A, B and C.

The pumping unit A is employed as a main burner pump and supplies fuel through a main burner control (not shown) to the main burners of an aircraft propulsion engine utilizing jet burners.

Fluid from the gear pumping unit C is supplied to an after burner control (not shown) which controls the supply of fuel to the burners of the after burner portion of a jet engine.

The third gear pumping unit B discharges to a fuel transferring means indicated generally by the reference numeral 31, operable to selectively parallel the discharge of the third pumping unit B with a discharge of the first and second gear pumping units A and C respectively.

Each gear pumping unit comprises a driven gear 34 meshing at an area of intermesh 36 with a driver gear 37. Extending axially outwardly from the hub portion of each respective driver and driven gear is a first shaft extension 38 and a second shaft 39. Each shaft extension 38 is journaled by a stationary bushing member 40 received in a corresponding housing bore and having a flange 41 providing a sealing face for engaging and sealing against the adjoining side face of the gear.

Each gear shaft extension 39 is journaled in the casing by a movable pressure loaded bushing 42 having a flange 43 providing a front face 44 for engaging and sealing against an adjoining gear side face and a rear face 46 which together with means including the housing 11 forms a pressure control chamber 47 communicating with pump generated discharge pressure to pressure load the movable bushing 42 into sealing relationship against the side face of the gear.

The housing part 12 is closed by cover member 48 assembled in firm assembly to the housing part 12 by a plurality of fasteners 49. A shaft driving member 50 has a splined portion 51 adapted to be connected to a prime mover on the outside of the pump and extends inwardly into the housing part 12 for connection to the gear pumping units A, B and C. The driving member 50 has a collar portion 52 splined to quill shaft 53 which extends through all the hollow shaft portions of the driver gears 37 of the gear pumping units A and B. The quill shaft 53 is, in turn splined to the driver gear of the gear pumping unit C and also to a second quill shaft member 54 which extends through the gear pumping unit C and has attached thereto at one end a gear 56 forming a part of gear train 57 driving the centrifugal impeller 21. Thus, the gears of the gear pumping units A, B and C are rotated at a speed corresponding to a rated efficiency speed for intermeshing gear impellers and the centrifugal impeller 21 is rotated at a much higher speed corresponding to the speed for greatest rated efficiency of centrifugal impellers. The cover member 16 is fastened to the housing part 15 by a plurality of fasteners indicated at 58, thereby enclosing the gear train 57 and closing the end of the pump housing 11.

The shaft extensions and the hubs of the driver gears 37 are hollow and the shaft extensions 38 and 39 as well of the hub portions of the driven gears 34 are also hollow, thereby providing through passages the length of the pump housing 11. Thus, all of the internal cavities such as the cavity 59 and the pump housing 11, which are separated from the actual outlet portions of the pump, can be communicated with a source of low pressure such as the pump inlet to facilitate the use of low pressure seals for minimization of leakage and other sealing problems.

In accordance with the principles of the present invention, a novel spur gear construction is utilized in the pump in order to substantially reduce the overall weight of the fuel pump and in order to improve the thermal energy transfer between the components of the pump. Since the detailed construction of each respective gear is identical insofar as the purposes of the present disclosure are concerned, advantageous reference can be made to Figs. 2 and 3 where a typical gear is illustrated in detail and where the reference numerals applied may be considered as applicable to all of the gears incorporated in the pump 10.

It is contemplated according to the present invention that each respective gear be provided in accordance with a process which includes the steps of producing a gear hub by a metallurgical process such as casting to form a unitary article having inner and outer wall surfaces formed by walls of substantially uniform thickness and shaped to provide a hollow gear hub having a plurality of circumferentially spaced hollow gear teeth.

For example, the gear article can be cast by the socalled "lost wax" method thereby providing a hub 70 characterized by a plurality of circumferentially spaced peripheral gear teeth each indicated at 71 extending radially outwardly and bounded by axially spaced gear side faces indicated at 72 and 73 respectively. The outlines of the teeth are involute curves as is provided in spur gears.

Extending in opposite directions from the gear side faces 72 and 73 are gear shaft extensions 38 and 39, respectively, each having formed on the peripheral surface thereof a bearing surface 74 and a bearing surface 76 for journalling the gear in an appropriate bushing means carried in the casing of the pump 10.

Figure 2:
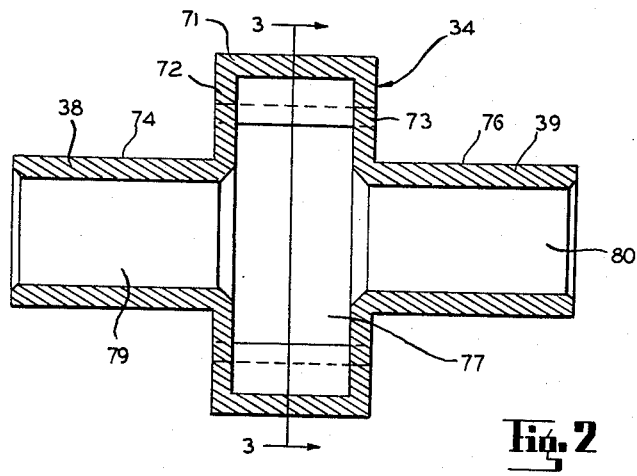
Figure 2 is a cross sectional view of one of the gears incorporated in the pump of Fig. 1 and taken substantially on line II—II of Fig. 3.
Figure 3:
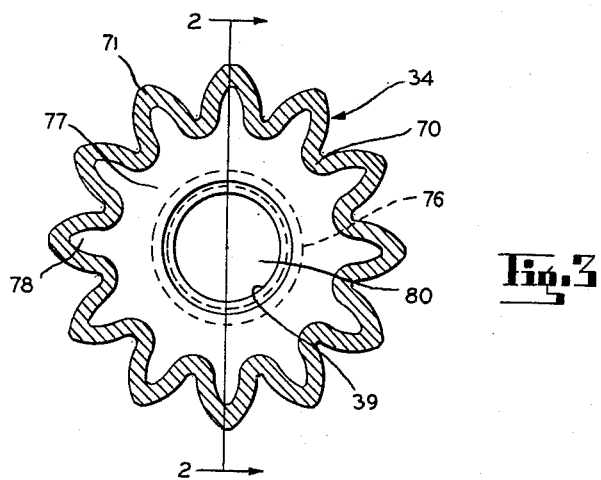
Figure 3 is a cross sectional view taken substantially on line III—III of Fig. 2.

The interior of the gear is clearly illustrated in Figs. 2 and 3 and it will be noted that an enlarged central recess 77 is bounded by a plurality of circumferentially spaced radially outwardly extending recesses or pockets 78 corresponding in number and locating to each specific gear tooth 71.

Extending axially outwardly from the central recess 77 are the hollow bores 79 and 80 in the respective gear shaft extensions 38 and 39.

Upon referring to Figs. 2 and 3, it will be noted that the wall section at any particular point in the entire gear article is of substantially uniform thickness so that the inner and outer wall surfaces at any particular cross sectional point are substantially parallel.

By virtue of such provision, on the inside of the gear, even into the teeth themselves the stock is cored out. By conventional machining processes, it would be impossible to provide an interior in a gear blank having such structural characteristics.

The thin walled gear thus provided not only affords great weight savings but affords another advantageous structural and functional feature. The low pressure fluid circulated throughout the pump enters the bores 79 and 80 as well as the central recess 77 and all of the tooth recesses or pockets 78 thereby flooding the entire interior surface of the gear with fluid pumping medium operable as a coolant. The thin walled section of the gear readily transmits thermal energy generated at the area of mesh at the teeth 71 and facilitates dissipation of thermal energy throughout the pump.

It will be appreciated that any metallurgical process may be conveniently employed in the production of the gear of the present invention including a "lost wax" casting process or a process whereby a briquette is formed by a powder metallurgical process as a unitary article having a thin walled structure. In a powder metallurgical process, powder particles are compacted into a coherent molded briquette shaped into the configuration of the toothed hollow gear hub and pressure is distributed uniformly so that a uniformly compacted body is provided. In any event, the molded article has the interior thereof cored out to establish the gear article having the advantageous structural features described in connection with Figs. 2 and 3.

Although various minor modifications might be suggested by those versed in the art, it should be understood that we wish to embody within the scope of the patent warranted hereon all such modifications as reasonably and properly come within the scope of our contribution to the art.

We claim as our invention:

1. In a gear pump, a casing having at least one pair of overlapping cylindrical bores providing a pumping chamber and including an inlet and an outlet, intermeshing gears in said bores for moving fluid from said inlet to said outlet, each gear consisting of a unitary article having inner and outer wall surfaces formed by walls of substantially uniform thickness and shaped to provide a hollow gear hub having a plurality of circumferentially spaced hollow gear teeth, each said gear further including gear side faces having oppositely extending hollow gear shaft portions, fixed bearing means in said casing having bearing surfaces for journalling one of said shaft portions of said gears, and movable pressure loaded bushing means in said casing having bearing surfaces journalling the other of said shaft portions of said gears, means communicating pump generated pressure to said movable bushing means to pressure load said bushing means, said fixed and movable bushing means having sealing faces engaging an adjoining wall of said gear side faces, and means in said casing flooding the interior of said hollow gears with fluid pumping medium at pump inlet pressure to dissipate thermal energy from the gear teeth.

2. In a gear pump, a casing having a pumping chamber formed therein and including an inlet and an outlet, intermeshing gears in said pumping chamber for moving fluid from said inlet to said outlet, each gear consisting of a unitary article having inner and outer wall surfaces formed by walls of substantially uniform thickness and shaped to provide a hollow gear hub having a plurality of circumferentially spaced hollow gear teeth, each said gear further including gear side faces having oppositely extending hollow gear shaft portions, bearing means in said casing having bearing surfaces for journaling said shaft portions of said gears, and means in said casing flooding the interior of said hollow gears with fluid pumping medium at pump inlet pressure to dissipate thermal energy from the gear teeth.

References Cited in the file of this patent

UNITED STATES PATENTS

| Number | Name | Date |
|---|---|---|
| Re. 2,369 | Roots | Oct. 2, 1866 |
| 61,592 | Williams | Jan. 29, 1867 |
| 736,039 | Wainwright | Aug. 11, 1903 |
| 922,875 | Fraser | May 25, 1909 |
| 1,059,163 | Jendrusik | Apr. 15, 1913 |
| 1,119,972 | Machlet | Dec. 8, 1914 |
| 1,287,268 | Edwards | Dec. 10, 1918 |
| 1,908,187 | Ross | May 9, 1933 |
| 2,126,200 | Linderman | Aug. 9, 1938 |
| 2,420,622 | Roth et al. | May 13, 1947 |
| 2,491,678 | McCulloch et al. | Dec. 20, 1949 |
| 2,695,566 | Compton | Nov. 30, 1954 |
| 2,704,465 | Haller | Mar. 22, 1955 |
| 2,769,396 | Norlin | Nov. 6, 1956 |
| 2,808,813 | Lindhagen et al. | Oct. 8, 1957 |

FOREIGN PATENTS

| Number | Country | Date |
|---|---|---|
| 5,364 | Great Britain | Mar. 13, 1893 |
| 251,443 | Great Britain | May 6, 1926 |
| 539,326 | France | Mar. 31, 1922 |
| 811,817 | Germany | Aug. 23, 1951 |